United States Patent Office 3,285,851
Patented Nov. 15, 1966

3,285,851
LUBRICANT
Robert Harris Dyer, Big Spring, Tex., assignor to Cosden Oil & Chemical Company, Big Spring, Tex., a corporation of Delaware
No Drawing. Filed Aug. 13, 1963, Ser. No. 301,886
3 Claims. (Cl. 252—32.5)

This application is a continuation-in-part of my copending application Serial Number 132,297, filed August 18, 1961, and now Patent Number 3,100,808.

This invention relates to a hydrogenated polyisobutylene lubricant base and to lubricants formed by modifying such base. A preferred lubricant formed from such base is an inverted water-in-oil emulsion hydraulic oil.

In my copending application Serial Number 132,297, filed August 18, 1961, now Patent 3,100,808, of which the present application is a continuation-in-part, I have described the treatment of liquid polyisobutylenes by hydrogenation which removes color and odoriferous components, converting the product to a water-white liquid. I have now found that a select fraction of such liquid has improved oiliness and stability whereby it is a superior liquid lubricant base.

Accordingly, in broadest aspect, my lubricating oil base is a hydrogenated polyisobutylene having a viscosity ranging from about 30 to 200 SSU at 210° F., where the oil base is to be used as a liquid lubricant or a fluid emulsified oil base, and a viscosity from about 30 up to about 400 SSU at 210° F. where the oil is to be further thickened, gelated or solidified for various thickened lubricant purposes such as a grease.

In a preferred aspect the lower viscosity range hydrogenated polyisobutylene of about 30 to 200 SSU at 210° F. has 5 to 75% of water dispersed therein as a water-in-oil emulsion, whereby the oil is outstandingly useful as hydraulic and transmission oil, the emulsion with this oil being stable and non-sludging while including a high safety, fire retardant property by the water content.

In another preferred aspect the hydrogenated polyisobutylene purer, whiter, non-odorous and more stable by being hydrogenated, is selected to be of narrow molecular weight range. Thus, an oil of viscosity from about 30 to 200 may be obtained in a narrow molecular weight ranging from about 125 to 450, and an oil with a viscosity from about 200 to 400 SSU at 210° F. may be obtained with a 350 to 700. Oils of this type in a narrow viscosity range have an even narrower molecular weight range. Consequently, the oils hereof as hydrogenated polymers of polyisobutylene have greater homogeneity as to their exact chemical comopsition; that is, they consist of a narrow range of polyisobutylene components.

These narrower range molecular weight polyisobutylenes are available by the process of the Jackson patent, 2,957,930, October 26, 1960, whose description is here incorporated by reference. It is summarized, according to the Jackson process, that isobutylene monomer feed to a polymerization reactor, initially passed thereto with the Friedel-Crafts catalyst, both in substantial concentration, the hydrocarbon being dissolved in a liquified $C_1$–$C_5$ refinery cut, is immediately continuouly and highly diluted by reaction mixture recycle from the reactor outlet at a high rate so that the polymerization of the isobutylene results from a very dilute phase. Such dilute phase polymerization of the isobutylene forms a homogeneous polymer in a narrow molecular weight range. The actual molecular weight of the polymer formed is controlled by variation of the temperature of the reactor. Consequently, the process makes available a narrow range molecular weight product as desired, which according to the present invention is hydrogenated to water-white, non-odorous, highly stable form and a select fraction is taken thereof for use as a lubricant.

For improved lubricant uses, my lubricant may have added thereto such common additives as alkali, alkali earth and heavy metal salts or soaps of fatty acids including sulfonated anionic acid detergents and such soaps of sulfurized oils. It may also have added various organic halogenated compounds and both which impart an extreme pressure characteristic to the oil. Other such useful additives as methacrylate polymers are often desirably included in small quantity for adjustment of the viscosity index. The pour point may be corrected with pour point depressers such as methyl naphthalene and others as known in the art. While an outstanding property of my oil is improved lubricity, conventional additives for this purpose such as phosphate esters including alkyl phosphates such as tributyl phosphate or aryl phosphates such as tricresyl phosphate and graphite, as known in the art, may be added for such purpose. These additives are usefully used in small quantity ranging from about 0.1 to 5% by weight/volume.

A preferred use of my lubricant, as mentioned, is as a hydraulic oil, and for this purpose the oil is preferably emulsified with water in the internal phase. Water in quantity of from 5 to 75% of the dispersion is dispersed in the oil, preferably using anionic or non-ionic wetting agents such as sodium lauryl sulfate, carboxy polyoxy lower alkylene ether of an alkyl phenol and polyoxy lower alkylene ether of alkyl phenol, each having from about 5 to 50 lower alkyleneoxy groups, preferably ethyleneoxy or propyleneoxy groups. Typically useful dispersing agents are sodiumcarboxy polypropyleneoxy ether of dinonyl phenol having about 10 propyleneoxy groups, carboxy polyethyleneoxy diisobutylphenol ether having 15 ethyleneoxy groups, or non-ionic wetting agents such as higher fatty acid esters of sorbitan; for example, the oleic acid ester of sorbitan or alkylaryl polyethylene oxide, for instance, the diisobutyl phenol polyethylene oxide having from 5 to 50 polyethyleneoxy groups, lecithin and the like, or ordinary heavy metal or ammonia soaps may also be used as the emulsifying agent. Other known emulsifying agents for water-in-oil type of emulsions may be used. Emulsions formed of hydrogenated polyisobutylene in the continuous phase are not only more stable as to sludging, but do not tend to separate into phases as compared to polybutene emulsions that have not been hydrogenated. Such emulsions being free of sludge formation do not clog oil filters.

My hydrogen polybutene lubricant also forms an improved base for conversion to solid greases which may be effected by adding thickeners such as soaps, clays and the like to the pure hydrogenated polybutene. For instance, the heavier polyisobutylene having a viscosity in the range of 200 to 400 may be converted to a grease by adding 10 to 35% of such soaps as sodium stearate, lead oleate, aluminum stearate, lithium palmitate, calcium oleate and the like to the oil. Other thickening agents such as the bentones comprising bentonite alone or mixed with lower amines and diamines such as diethyl triamine, tetraethylene pentamine and the like, or the bentonite clay may be used alone with various suspending agents in the oil or with the soap as a suitable thickener for the oil base. Depending upon the quantity of the gelating agent, the grease will range from a viscous cream to a hard grease, or other various known useful consistencies.

The following examples will illustrate the practice of my invention.

EXAMPLE I

Hydrogenation of polybutene

A glass tube was filled with granules of platinum chloride supported on kieselguhr. The tube was wrapped externally with electrical heating tape and heated to a temperature of 650 F. Hydrogen gas was passed through the catalyst for a period of two hours at a rate of 0.05 cubic foot per second. Thereafter, the temperatuere was reduced to 400° F. and the hydrogen flow adjusted to 0.03 cubic foot per second. Polybutene, formed by Friedel-Crafts polymerization, as described in the U.S. patent to Jackson, 2,957,930, and having an initial viscosity (SSU 210° F.) of 390, was introduced into the top of the tube and flowed counter-current to the hydrogen at a rate of about 2 grams per minute having a residence time in the tube of approximately two minutes. The properties of the polymeric material before and after the hydrogenation were as follows.

|  | Feed | Product |
| --- | --- | --- |
| Color (Gardner) | 2 | Less than one. |
| Viscosity (SSU 210° F.) | 390 | 405. |
| Bromine Number | 16.5 | 8.0. |
| Odor | Pungent | Bland. |

EXAMPLE II

The following table illustrates specific properties of two typical compositions prepared according to the procedure of Example I.

|  | A | B |
| --- | --- | --- |
| Molecular Weight | 400 | 575 |
| Vis. SSU at 100° F | 148 | 11,200 |
| Vis. SSU at 210° F | 42 | 383 |
| Spec. Grav. 60°/60° | .839 | .860 |
| Pounds per gallon | 6.99 | 7.16 |
| Flash Point C.O.C° F | 270 | 315 |
| Fire Point C.O.C° F | 290 | 360 |
| Color-Cosden Modified APHA [1] | 10 | 10 |
| Color after 24 hrs. at 250° F | 10 | 10 |
| Odor after 24 hrs. at 250° F | Bland | Bland |
| Acid No. (Mg. KOH/gm.) | 0.02 | 0.01 |
| Free Sulphur | None | None |
| Total ASTM Sulphur D-129-58 | Nil | Nil |
| Carbon Residue | Nil | Nil |
| Total Chloride, weight percent | 0.001 | 0.001 |
| Total Iron, weight percent | 0.001 | 0.001 |
| Percent Moisture | Nil | Nil |

[1] American Public Health Association.

EXAMPLE III

Crankcase lubricant

A water-white oil hydrogenated as in Example I, but comprising a preformed polybutene fraction formed by the method of Jackson and having a viscosity of about 140 SSU at 210° F. has added thereto 2% of tricresyl phosphate and 1% of sulfurized cocoanut oil and ½% of sodium lauryl sulfate, and the mixture was stirred while heating at about 200° F. until the components dissolve. The oil was used as a crankcase lubricant for a 600 H.P. high speed diesel engine together with the usual oil filter and operated for common road test driving a truck for a distance of 3,000 miles. It was found that the oil had left no deposit on the filter and showed only a slight increase in color from the original water white. A second oil composition was made up using unhydrogenated oil which was substantially saturated but which corresponded to the same oil before hydrogenation, was made up with exactly the same additives. At the end of 3,000 miles of similar road test driving using the unhydrogenated oil, the color of the oil had greatly depreciated. The odor, initially somewhat oily, had substantially depreciated and the oil filter was covered and clogged with a dark sludge, in very apparent contrast to the hydrogenated oil.

EXAMPLE IV

Hydraulic oil

A water-white polyisobutylene fraction, formed as in Example I, and having an initial viscosity at 210° F. of 44 SSU is mixed first with 6% of polyethyleneoxy diisobutylphenol ether having an average of 13 to 15 polyethyleneoxy groups, is homogenized by slow addition of water in total quantity of 44% by volume, the water passing into the internal phase. A second emulsion of the same viscosity of polyisobutylene formed as in the Jackson patent, which was not hydrogenated, however, was formed using the same emulsifying agent in the same quantity and emulsifying the same quantity of water so that the two emulsions were exactly comparable except that the polyisobutylene was hydrogenated in one instance, according to Example I, but was not hydrogenated in the other. Both emulsions were circulated by a gear pump under 1,000 pounds pressure through an oil filter and through a valve in the line set to build up a back pressure in the line of that amount of pressure against the pump, the circulated emulsion then being returned after filtering to a reservoir from which the pump took suction, the temperature of the entire system being maintained at 200° F. Both oil emulsions were thus subjected to a continuous circulation, pumping under 1,000 pounds pressure for a period of 200 hours. At the end of this period the unhydrogenated emulsion showed very heavy sludge deposits on the filter. In the same time period the hydrogenated oil showed no sludge deposit at all. A comparison of emulsion stability of the unhydrogenated oil showed that after 30 minutes substantial separation of the oil from the emulsion as an upper layer took place in the same system, operating under the high pressure pumping conditions described. The emulsion of the hydrogenated oil, however, showed no change after 30 minutes, no change after two hours and no change after twenty hours.

Certain modifications will occur to those skilled in the art and, accordingly, it is intended that the specification and examples be regarded only as illustrative except as defined in the claims appended hereto.

I claim:

1. A lubricant base comprising a polyisobutylene of narrow molecular weight range formed by polymerizing isobutylene with a Friedel-Crafts catalyst while maintaining the isobutylene in a highly dilute solution, said polyisobutylene being hydrogenated to substantially colorless, odorless and stable form, and having a viscosity in the range of 30 to 400 SSU at 210° F. and a molecular weight in the range of 125 to 700, said lubricant base containing an additive selected from the group consisting of alkali, alkali earth and heavy metal organic compounds of carboxylic and sulfonic acids, sulfurized oils, halogenated organic compounds, methacrylate polymers and phosphate esters, and having dispersed therein from 5 to 75% of water, the water being in the internal phase.

2. A lubricant base comprising a polyisobutylene of narrow molecular weight range formed by polymerizing isobutylene with a Friedel-Crafts catalyst while maintaining the isobutylene in a highly dilute solution, said polyisobutylene being hydrogenated to substantially colorless, odorless and stable form, and having a viscosity in the range of 30 to 200 SSU at 210° F. and a molecular weight in the range of 125 to 700 and has dispersed therein from 5 to 75% of water, the water being in the internal phase.

3. Hydraulic oil comprising about 25 to 95 volume percent of a hydrogenated, substantially saturated, substantially colorless, odorless and stable polyisobutylene having a viscosity in the range of 30 to 200 SSU at 210° F. and a molecular weight in the range of 125 to 450, having dispersed therein, as a water-in-oil emulsion, about 5 to 75% of water and a small quantity of an emulsifying agent.

References Cited by the Examiner

UNITED STATES PATENTS

| | | | |
|---|---|---|---|
| 2,665,256 | 1/1954 | Barker | 252—49.5 X |
| 3,071,543 | 1/1963 | McGee | 252—49.3 |
| 3,007,452 | 2/1963 | Fainman | 252—59 |

DANIEL E. WYMAN, *Primary Examiner.*

C. F. DEES, *Assistant Examiner.*